United States Patent
Saeki (10) Patent No.: US 6,866,141 B2
(45) Date of Patent: Mar. 15, 2005

(54) CURVE CONVEYOR BELT

(75) Inventor: Naoyuki Saeki, Yamatokohriyama (JP)

(73) Assignee: Nitta Corporation, Osaka (JP)

( * ) Notice: Subject to any disclaimer, the term of this patent is extended or adjusted under 35 U.S.C. 154(b) by 0 days.

(21) Appl. No.: 10/477,667

(22) PCT Filed: May 7, 2002

(86) PCT No.: PCT/JP02/04439

§ 371 (c)(1),
(2), (4) Date: Nov. 11, 2003

(87) PCT Pub. No.: WO02/092475

PCT Pub. Date: Nov. 21, 2002

(65) Prior Publication Data

US 2004/0144626 A1 Jul. 29, 2004

(30) Foreign Application Priority Data

May 11, 2001 (JP) ........................................ 2001-141519

(51) Int. Cl.[7] .......................... B65G 15/02; B65G 15/30
(52) U.S. Cl. .................... 198/844.2; 198/831; 198/841; 198/842
(58) Field of Search ............................... 198/831, 840, 198/842, 844.2

(56) References Cited

U.S. PATENT DOCUMENTS

| | | | | |
|---|---|---|---|---|
| 4,185,737 A | * | 1/1980 | Blattermann | ................. 198/831 |
| 4,427,107 A | * | 1/1984 | Roberts et al. | ........... 198/844.2 |
| 5,951,441 A | * | 9/1999 | Dalebout et al. | ............. 482/54 |

FOREIGN PATENT DOCUMENTS

| | | | | |
|---|---|---|---|---|
| JP | 03260435 A | * | 11/1991 | ............. F16G/3/10 |
| JP | 04277112 A | * | 10/1992 | ........... B65G/15/30 |
| JP | 05270627 A | * | 10/1993 | ........... B65G/15/30 |
| JP | 05-319530 A1 | | 12/1993 | |
| JP | 2002-46835 A1 | | 2/2002 | |
| JP | 2002-87565 A1 | | 3/2002 | |
| JP | 2002-114342 A1 | | 4/2002 | |
| JP | 2002-226025 A1 | | 8/2002 | |

OTHER PUBLICATIONS

Microfilm of the specification and drawings annexed to the request of Japanese Utility Model Application No. 135229/1985 (Laid–open No. 44813/1987)(Mitsuboshi Belting Ltd.), Mar. 18, 1987.
Patent Abstracts of Japan for JP2002–226025 published on Aug. 14, 2002.
Patent Abstracts of Japan for JP2002–114342 pulished on Apr. 16, 2002.
Patent Abstracts of Japan for JP2002–87565 published on Mar. 27, 2002.
Patent Abstracts of Japan for JP05–319530 published on Dec. 3, 1993.
Patent Abstracts of Japan for JP2002–46835 published on Feb. 12, 2002.

\* cited by examiner

Primary Examiner—Eileen D. Lillis
Assistant Examiner—Mark A. Deuble
(74) Attorney, Agent, or Firm—Darby & Darby (57) ABSTRACT

A joining line from a portion of a belt caught and held between a driving roller and a pinch roller and the vicinity thereof to an outer peripheral end of the belt is a single straight line or a gentle curve having a large angle with respect to a tangent to a belt peripheral line. The joint of the other part of the belt is made by a finger joint. Alternately, a joining part from a portion of a belt caught and hold between a driving roller and a pinch roller and the vicinity thereof to an outer peripheral end of the belt is made with a finger joint with widely pitched fingers, while another joining part of the rest of the belt are made with a finger joint with narrowly pitched fingers. Peeling or breakage at the joining parts for a long time, and a thick joining part are eliminated. And low cost production is achieved.

4 Claims, 13 Drawing Sheets

CURVE CONVEYOR BELT

FIELD OF THE INVENTION

The present invention relates to a conveyor belt used in a curve conveyor (hereinafter referred to as a curve conveyor belt).

BACKGROUND OF THE INVENTION

A conventional curve conveyor, for example, includes a curve conveyor belt with a bead stretched between two end rollers arranged at a predetermined angle on a conveyor main body. The curve conveyor belt is driven by being held between a driving roller and a pinch roller either at an outgoing side or an incoming side of the belt. In order to prevent the belt from only inward shifting due to the centripetal force during rotation, the conveyor belt is provided with the a bead to be engaged with a shift prevention member.

In the above conventional curve conveyor belt, large complex forces such as stretching force act on the portion of the belt that extends from the held position by the driving and pinch rollers to the bead. Therefore, the conventional curve conveyor belt is, in general, formed by joining both ends of a fan-shaped belt-forming sheet with a skiving joint or a step joint.

However, such joint methods make the joining part thicker and increase the number of manufacturing steps, and thereby resulting in rise of manufacturing cost.

One possible way to solve the foregoing problem could be to employ a finger joint system. However, the finger joint system still causes a problem that peeling and breakage are generated in a short period within the belt portion that extends from the held portion between the driving and pinch rollers to the bead.

Therefore, it is an object of the present invention to provide a curve conveyor belt in which (1) neither peeling nor breakage is generated, (2) the joining part does not become thicker, and (3) the manufacturing cost is low.

SUMMARY OF THE INVENTION

In the present invention, a curve conveyor belt is formed by joining ends of a fan-shaped belt-forming sheet and is rotatingly driven in a fashion that a portion of the belt is caught and held between a driving roller and a pinch roller. The joining line within the area from the portion held between the driving and pinch rollers and the vicinity thereof to the outer peripheral end of the belt is a single straight line or a gentle curved line which has a large angle with respect to a tangent to the belt peripheral line. The joint for the other area is made with a finger joint.

In this curve conveyor, the above large angle may be 45 to 90°.

Furthermore, a curve conveyor belt of the present invention is formed by joining ends of a fan-shaped belt-forming sheet and is rotatingly driven in a fashion that a portion of the belt is caught and held between a driving roller and a pinch roller. The joint within the area from the portion held between the driving roller and the pinch roller and the vicinity thereof to the outer peripheral end is made by a finger joint of widely pitched fingers. And other area of the belt is joined by a finger joint of narrowly pitched fingers.

The above and other objects and advantages of the present invention will be apparent from the following description read in conjunction with the accompanying drawings.

DETAILED DESCRIPTION OF THE INVENTION

Figure 1:
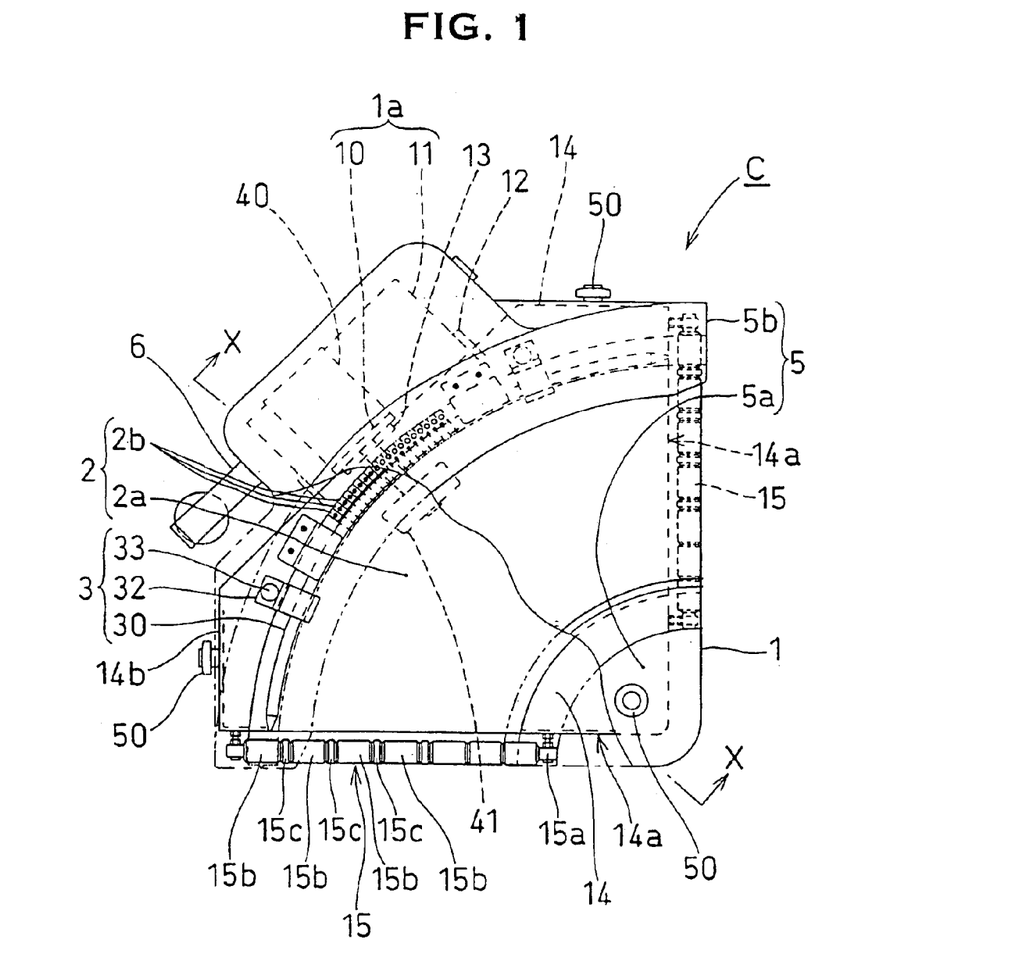
FIG. 1 is a plan view of a curve conveyor employing a conveyor belt with bead according to an embodiment of the present invention.
Figure 2:
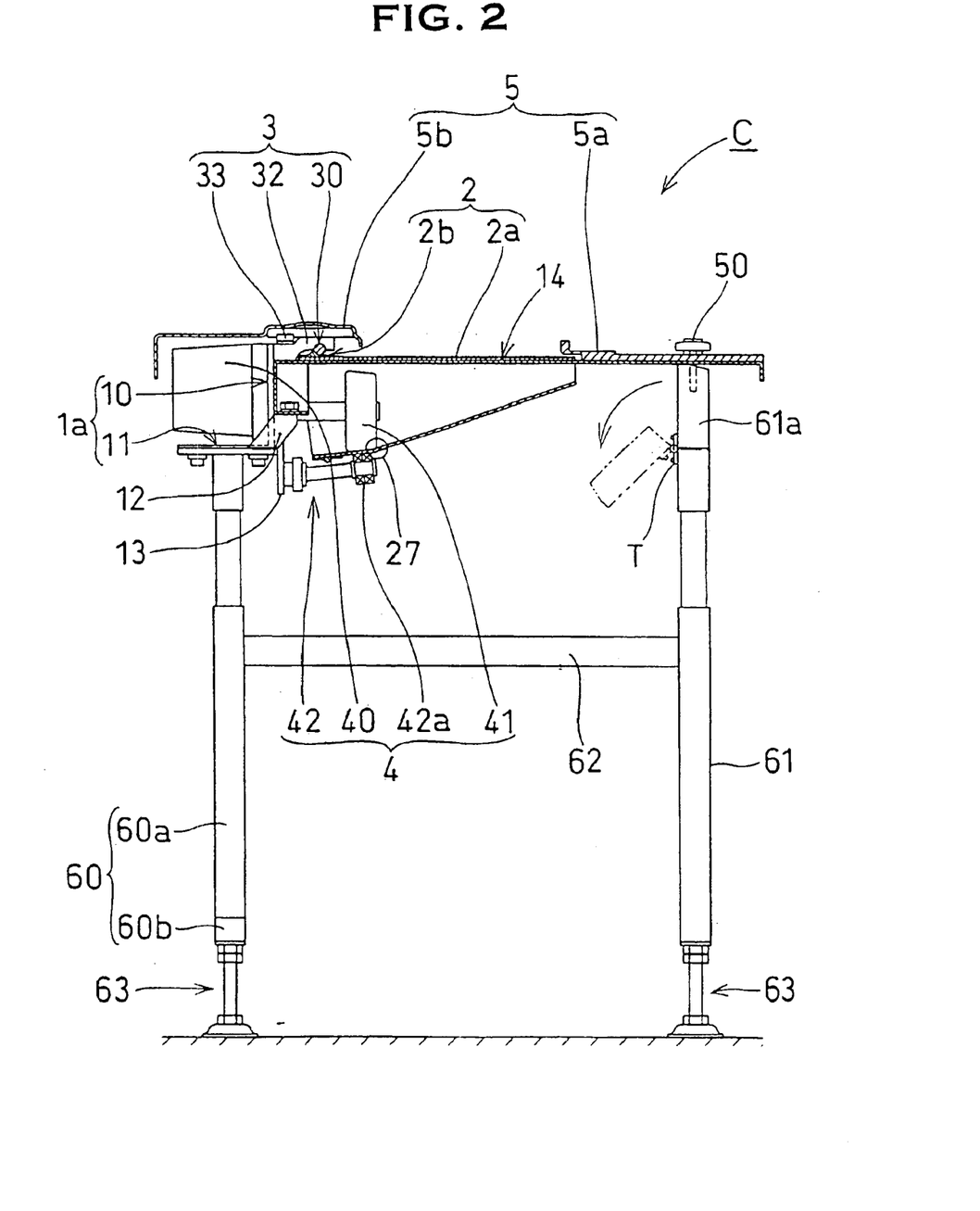
FIG. 2 is a sectional view taken along the line X—X of FIG. 1.

FIG. 1 shows a plan view of a conveyor C which employs a curve conveyor belt 2 according to this invention. FIG. 2 is a sectional view of the conveyor C of FIG. 1 taken along the line X—X, and FIG. 3 is a bottom view of the conveyor C.

Figure 3:
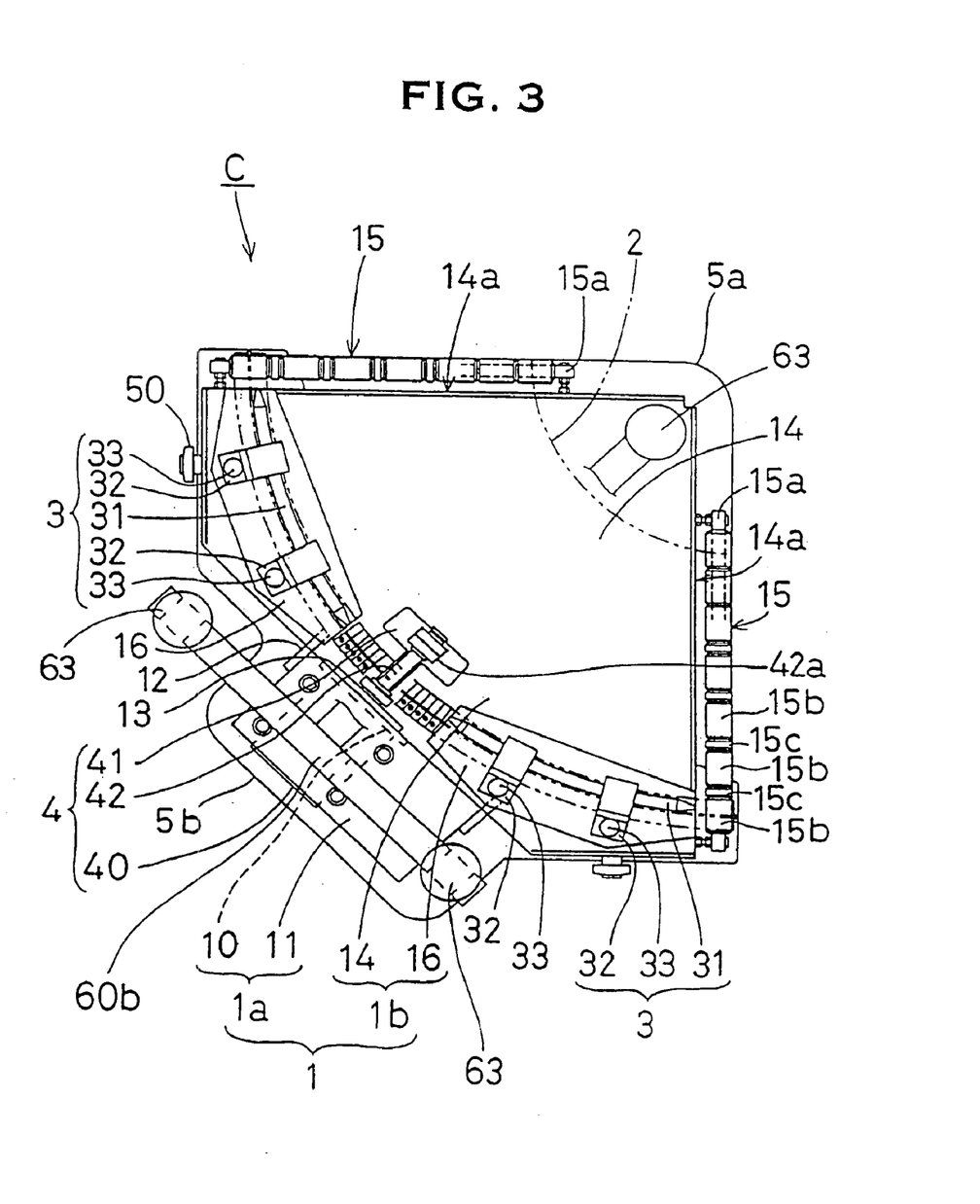
FIG. 3 is a bottom view of the belt conveyor.

A basic constitution of this conveyor C is shown in FIGS. 1 to 3. The conveyor C includes a conveyor main body 1, a curve conveyor belt 2 stretched on the conveyor main body 1, a shift prevention member 3 for preventing the curve conveyor belt 2 from shifting inwardly, and a driving member 4 for rotationally driving the curve conveyor belt 2. The conveyor C also includes a cover member 5 which covers a motor 40 with a decelerator for the driving member 4, the shift prevention member 3 on the upper side and an inner and an outer peripheral portion of the curve conveyor belt 2, and a leg member 6 which keeps the conveyor main body 1 at a suitable height. These main parts of the conveyor C will be described in detail below.

The conveyor main body 1, as shown in FIG. 1, includes a motor support element 1a, and a belt support element 1b bolted to the motor support element 1a.

As shown in FIGS. 2 and 3, the motor support element 1a is composed of a motor mounting plate 10 and a base plate 11 provided on the upper end of the leg member 6, and formed in an L-shape in a side view. The base plate 11 has bracket portions 12 at both end portions thereof. The motor mounting plate 10 has a unit mounting plate 13 at the side of the belt support element 1b.

Figure 4:
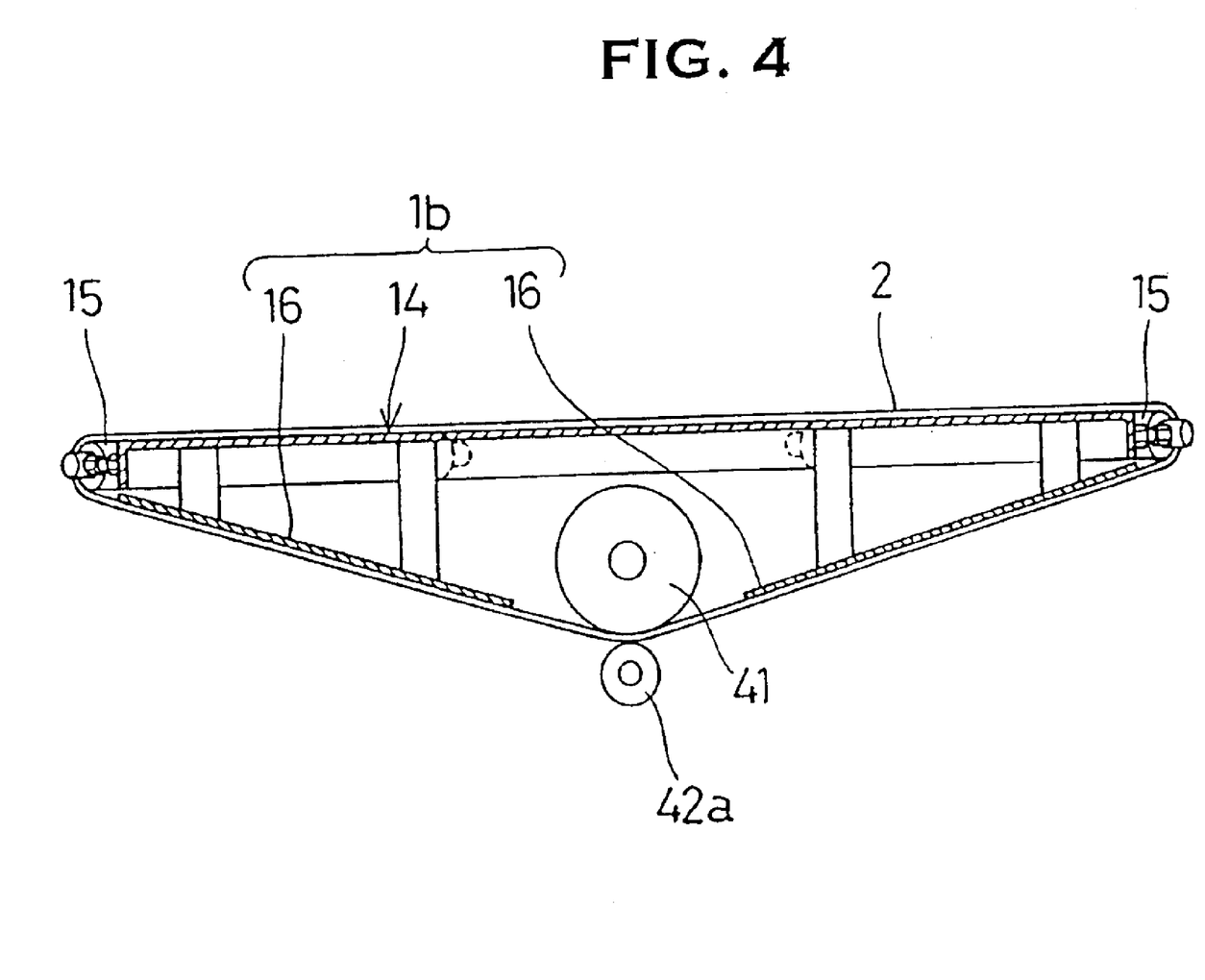
FIG. 4 is a view showing an aspect in which the conveyor belt with bead is stretched between the end rollers in the belt conveyor.

As shown in FIGS. 1, 3 and 4, the belt support element 1b includes a belt mounting plate 14 and two belt guide plates 16 and 16 which are fixed with a lower face of the belt mounting plate 14 through brackets. As shown in FIG. 2, the belt mounting plate 14 is bolted to the bracket portion 12. The belt mounting plate 14, as shown in FIG. 1, is formed in a pentagonal shape in a plan view. Bent pieces 14a and 14a provided at an angle of 90 degrees respectively receive straight end rollers 15 having a diameter of approximately 15 to 30 mm. As shown in FIGS. 1 and 3, the end roller 15 includes a stainless steel axial piece 15a bolted to the bent piece 14a and plural resin rollers 15b are attached rotatably on the axial piece 15a. A bearing 15 c (which has the same diameter as or a little larger diameter than the outer diameter of the roller 15b) is interposed between the resin rollers 15b and 15b provided near the outer peripheral side of the belt.

Figure 7:
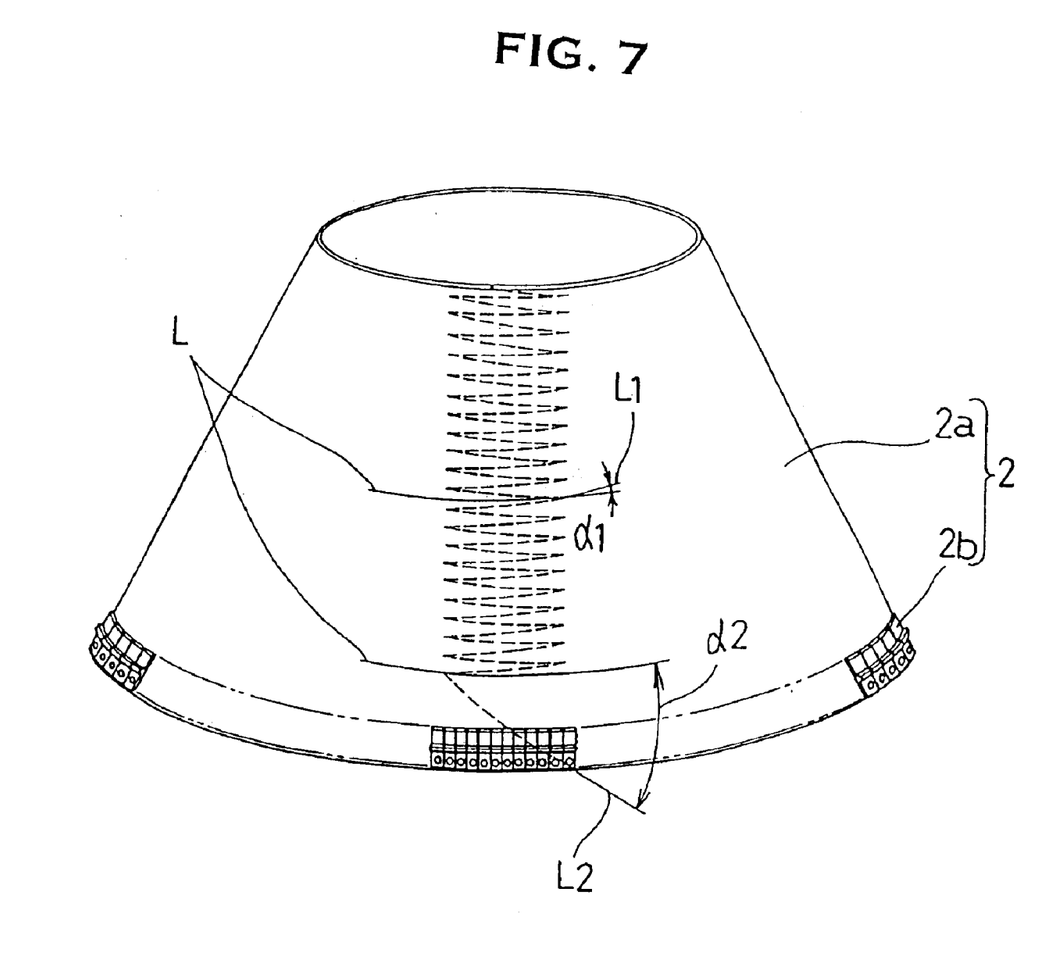
FIG. 7 is a perspective view of the conveyor belt with bead.

The curve conveyor belt 2, as shown in FIGS. 1 and 7, includes a belt body 2a and a number of narrow bead composing elements disposed across an entire outer peripheral end of the belt body 2a.

The belt body 2a is made with a fan-shaped belt-forming sheet that has a polyester sail cloth as a core body thereof and a thermoplastic polyurethane as a surface material of a conveying face. Both ends of the fan-shaped belt-forming sheet are joined together to make a tapered tube shape as shown in FIG. 7.

Figure 6:
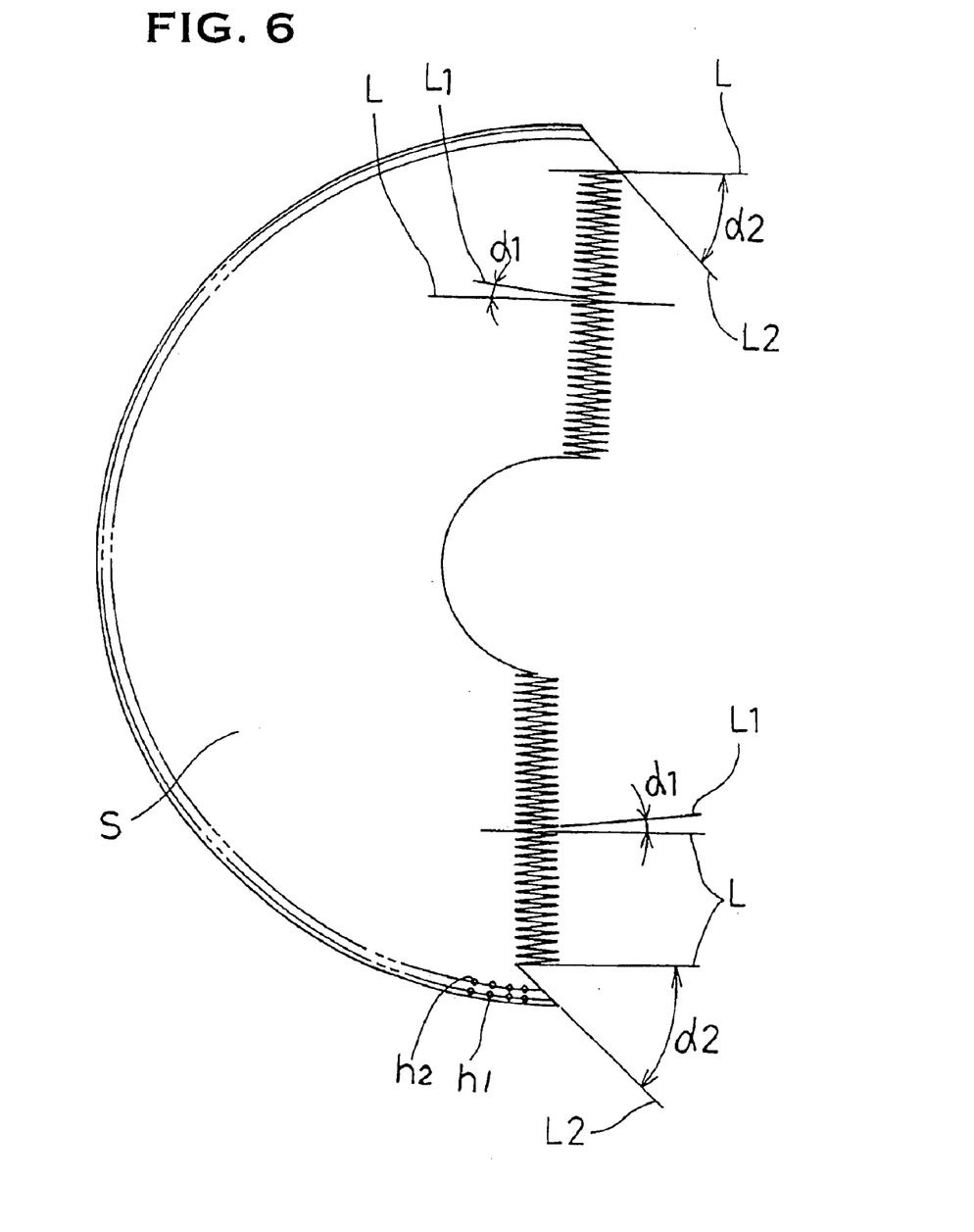
FIG. 6 is a plan view of a belt-forming sheet for forming a belt body.
Figure 8:
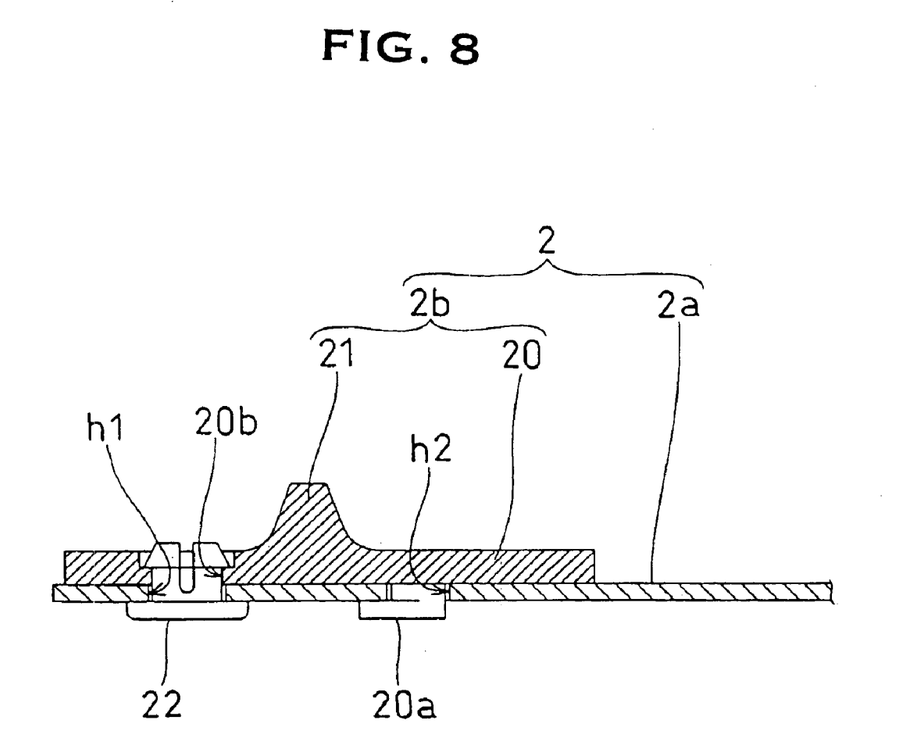
FIG. 8 is a sectional view showing a state in which a bead composing element is attached on the belt body.

Here, the belt body 2a is manufactured in the following manners (1) and (2):

(1) As shown in FIG. 6, a sheet, which has a polyester sail cloth as a core body and a thermoplastic polyurethane as a surface material of a conveying face, is punched out into a fan shape with a Thompson blade. The sheet punched in a fan shape, or the belt forming sheet S, has end portions to be joined together. Each of the end portions is formed in fingers-like shape extending from the inner peripheral end up to near the outer peripheral end wherein a finger tip angle is small (an angle α1 between a cut line L1 of the finger and a tangent L to the belt peripheral direction line is small). The part from the portion held by the driving roller 41 and the pinch roller 42a and the vicinity thereof up to the outer peripheral end is formed with a single cut line L2 having a large angle α2 of 45° to 90° with respect to the tangent L to the belt peripheral direction line. Furthermore, as shown in FIGS. 6 and 8, a number of through holes h1 and h2 for attaching a number of bead composing elements 2b are provided near the outer peripheral end of the belt body 2a of the belt forming sheet S.

The sail cloth and the surface material of the belt forming sheet S to form the belt body 2a are not limited to the above.

Figure 13:
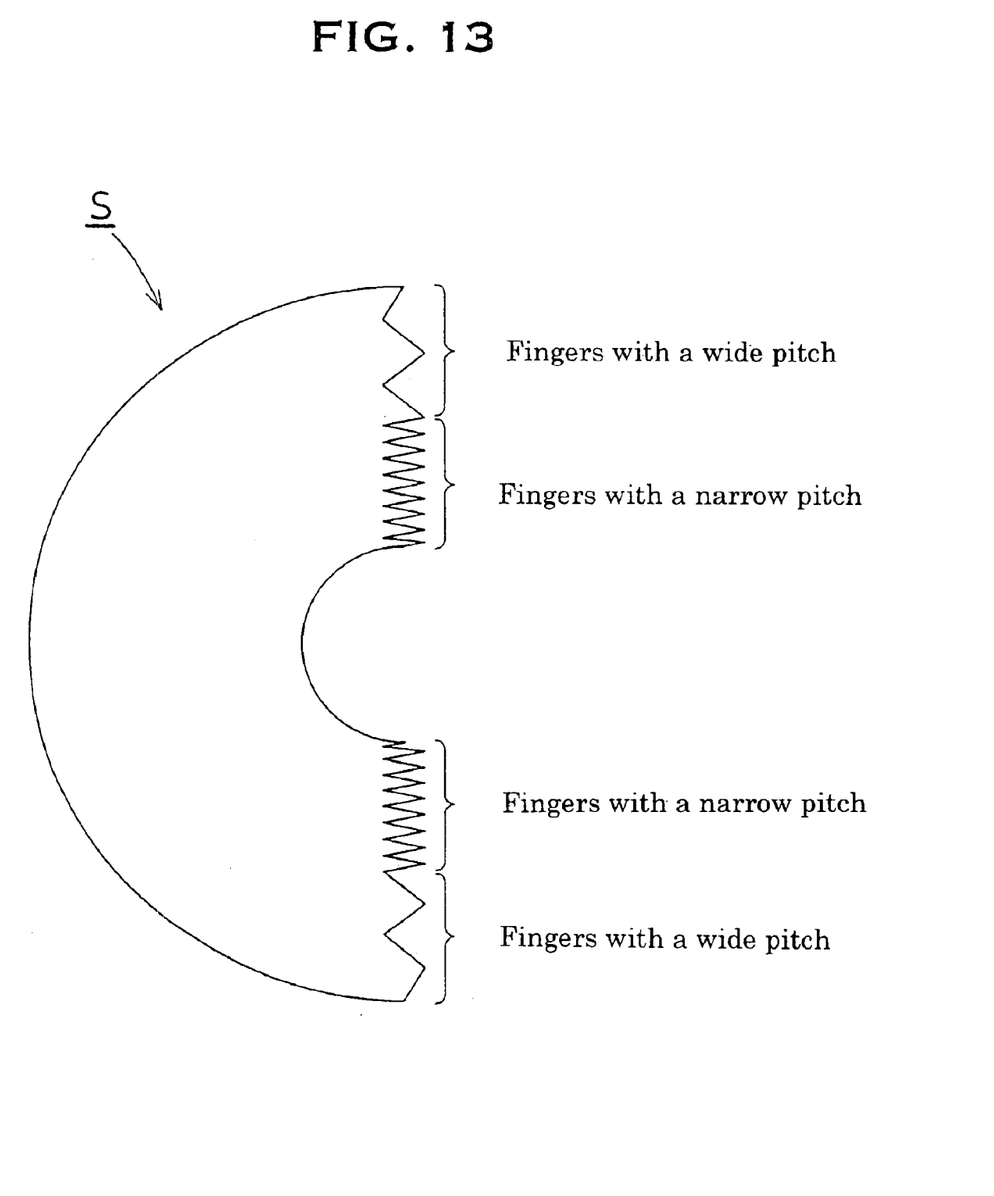
FIG. 13 is a plan view of a belt-forming sheet for forming a belt body according to another embodiment.

Furthermore, the above-mentioned cut line L2 may be a curved line. As shown in FIG. 13, the joining portions may have widely pitched fingers of a pitch of about 30–100 mm in the part from near the portion to be held by the driving roller 41 and the pinch roller 42a up to the outer peripheral end, and narrowly pitched fingers of a pitch of about 5–30 mm in the other part. And the end portions are joined with these fingers. The portion to be held by the driving roller 41 and the pinch roller 42a may be set at a position near the outer peripheral side, or near an inner peripheral side, or at a position therebetween.

(2) The end portions of the belt forming sheet S to be joined together are meshed with each other as shown in FIG. 7. And a urethane sheet is applied on the thermoplastic polyurethane joined with the fingers and heat and pressure are applied thereon. In consequence, urethane of the urethane sheet is melt to infiltrate into gaps present between the joining edges, so that the ends of the sheet S are joined together. As a result, there forms a joining line at the joined part between the cut lines L1 and L1 to be in contact with each other and also of the cut lines L2 and L2.

The bead composing element 2b, as shown in FIG. 8, includes a rectangular plate portion 20 and a thick portion 21 (or a projecting portion) provided on a longitudinal center portion of the plate portion 20 which has a substantially trapezoidal shape in a side view, and the portions 20 and 21 are integrally formed with synthetic resin or sintered metal. The plate portion 20 has an engaging part 20a at one side and an engaging hole 20b at the other side. When the bead composing element 2b is attached on the belt body 2a, as shown in FIG. 8, the engaging part 20a is fit into the through-hole h2, while a pin 22 is fit into the through-hole h1 and the engaging hole 20b, so that the bead composing element 2b is fixed with the belt body 2a. Here, in the bead composing element 2b, for example, the plate portion 20 may have an 8.5 mm width in the belt forwarding direction in the outer peripheral edge side of the belt, an 8 mm width in the belt forwarding direction in the inner peripheral edge side thereof, and a length of 30 mm. Furthermore, the thick portion 21 may have a height of 4 mm and the side face thereof has a 70° inclination angle.

Figure 9:
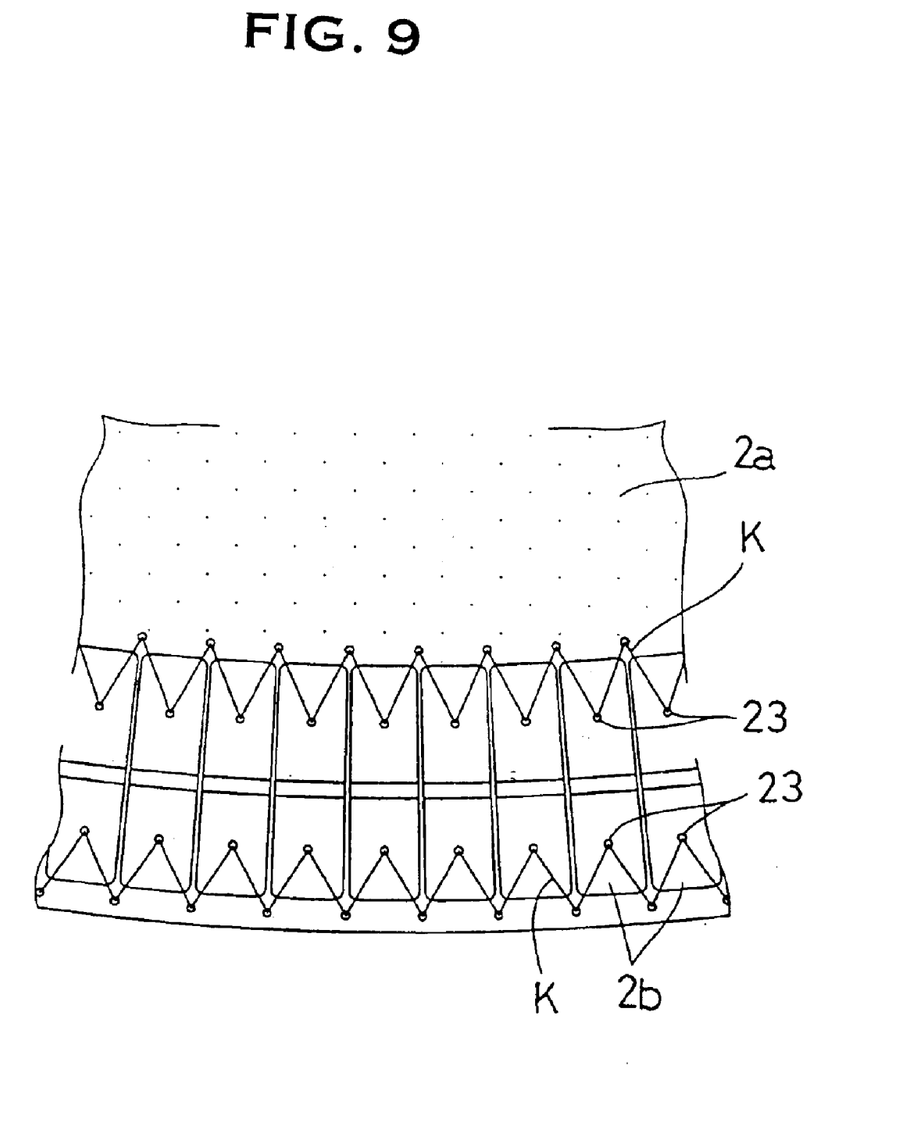
FIG. 9 is a sectional view showing another method for attaching bead composing elements on the belt body.
Figure 10:
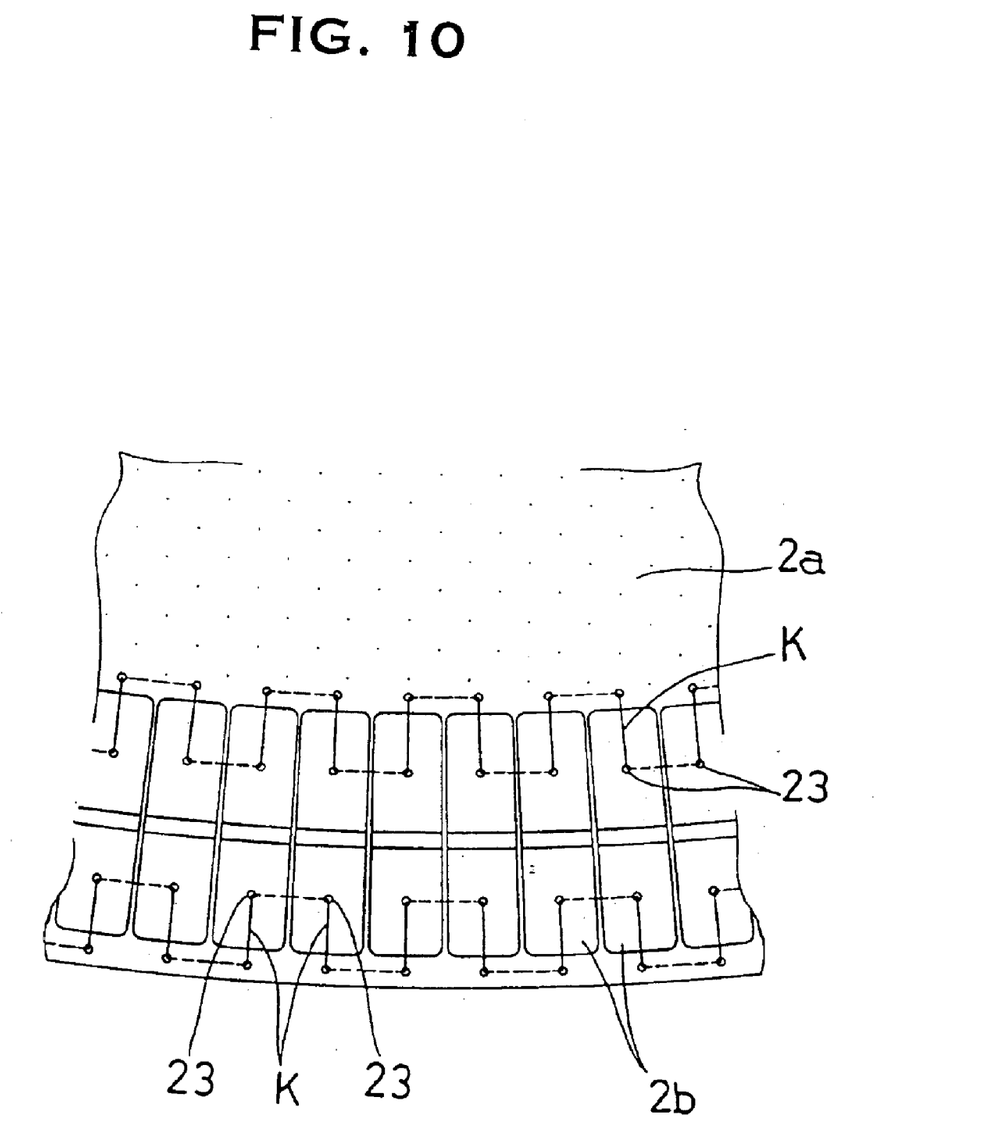
FIG. 10 is a sectional view showing another method for attaching bead composing elements on the belt body.
Figure 11:
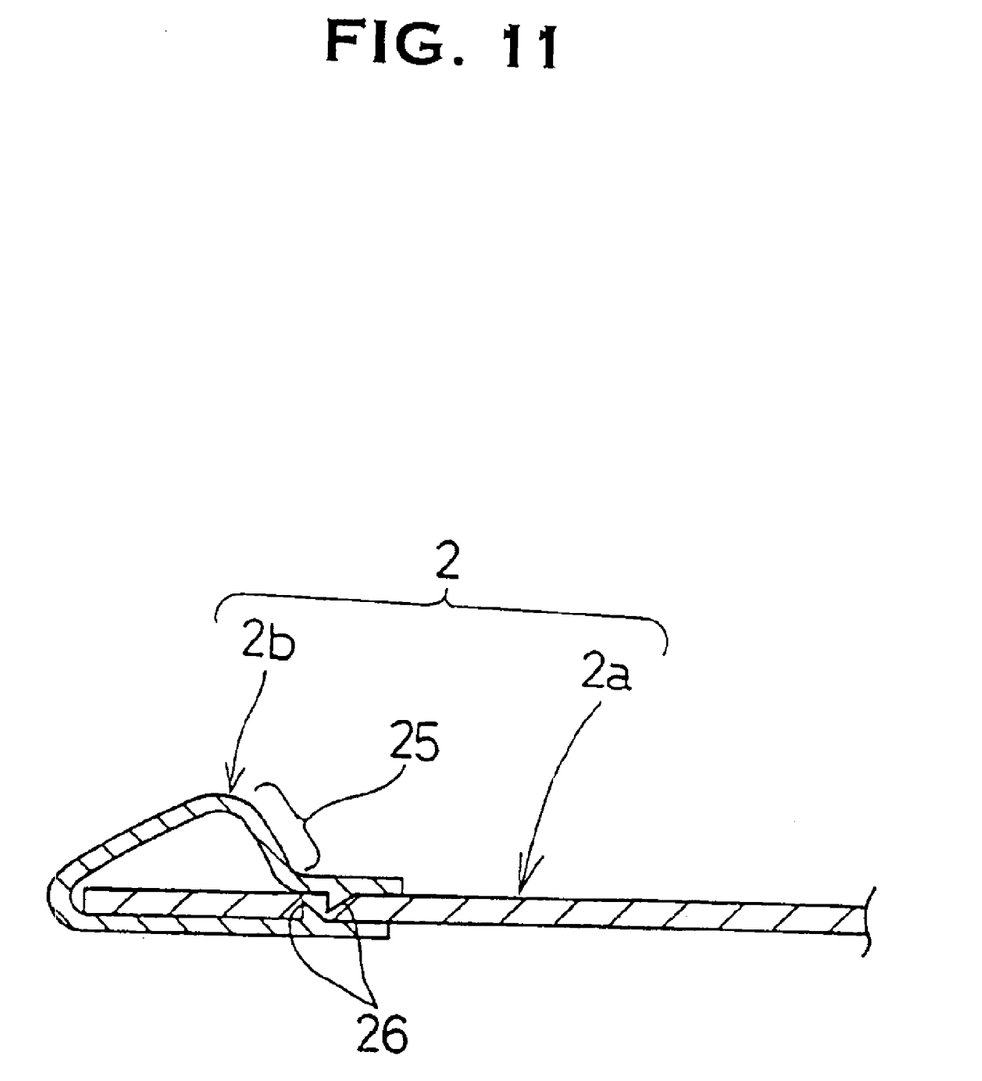
FIG. 11 is a sectional view showing another method for attaching another bead composing element on the belt body.

The way of attaching the bead composing element 2b to the belt main body 2a is not limitative to the above. As shown in FIGS. 9 and 10, the bead composing element 2b may be attached thereto with a thread K through a hole 23 formed on the bead composing element 2b. Furthermore, a pressed plate structure as shown in FIG. 11 may be used as the bead composing element 2b. In this bead composing element 2b, a steel plate is bent to make a slant surface 25 which is in contact with the guide members 30, 31 and 31. This pressed plate structure is attached to the belt main body 2a with a claw 26 which bites down the belt body 2a.

The bead composing element 2b may be applicable if the width in the belt forwarding direction is as approximately 20 to 60% narrow as the diameter of a straight end roller which has a small diameter.

Figure 12:
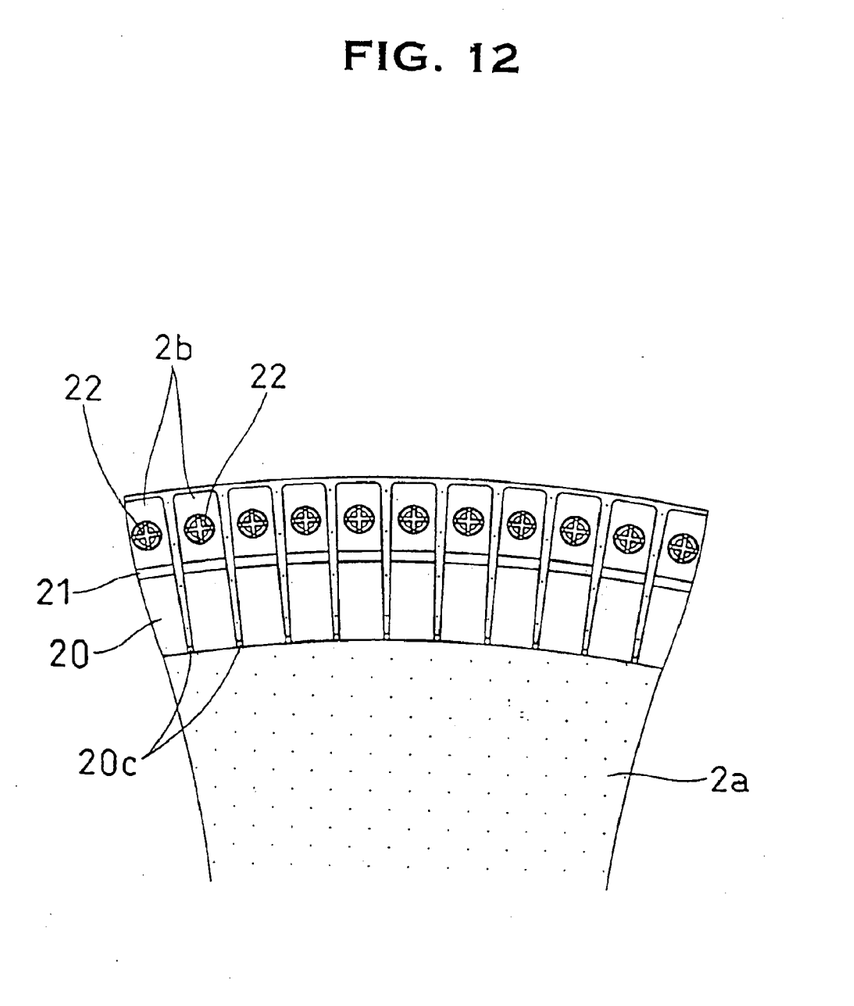
FIG. 12 is a plan view of bead composing elements according to another embodiment.

The adjacent bead composing elements 2b and 2b may be joined together through an elastic bendable thin piece 20c (integrally formed), as shown in FIG. 12.

Then, the bead composing element 2b may be either detachable from the belt body 2a as described above, or be fixed thereto.

The shift prevention member 3, shown as in FIGS. 1 and 3, includes an upper side guide member 30, lower side guide members 31 and 31, a press member 32 and a screw 33. The press member presses the upper side guide member 30 and the lower side guide members 31 and 31 against the slant surface of the thick portion 21 of the bead composing element 2b. The screw 33 is manually used for fixing the press member 32 with the upper side of the belt mounting plate 14 and the lower sides of the belt guide plates 16 and 16.

Figure 5:
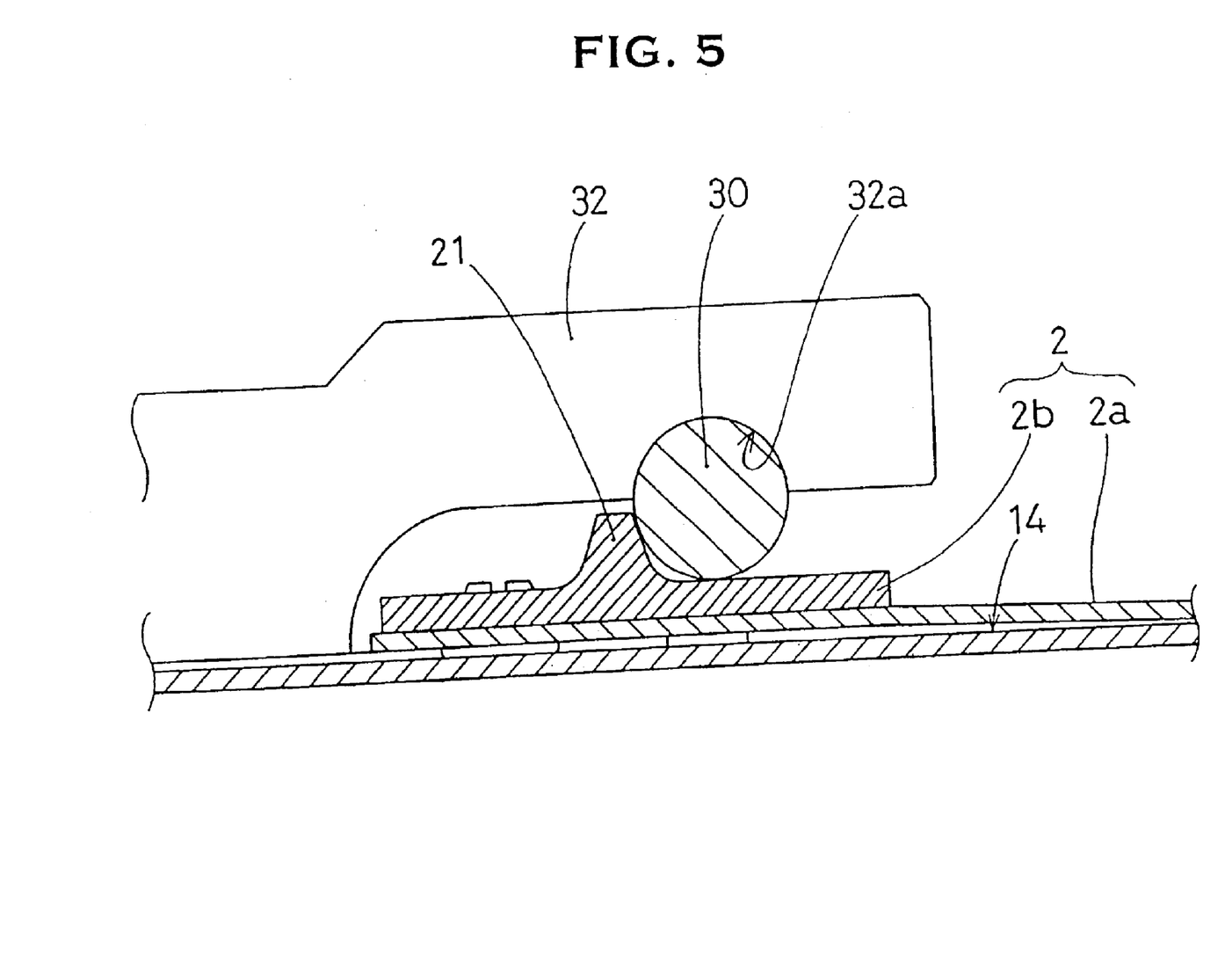
FIG. 5 is a sectional view showing a relation between a bead composing element and a shift prevention member employed in the belt conveyor.

The upper side guide member 30, shown in FIGS. 1 and 5, is provided on the upper side of the belt mounting plate 14 to prevent the inward shift of the belt, formed with a round bar having shortly tapered ends at the both ends, and shaped in an arc with a curvature radius to contact with the inner side slant face of the thick portion 21.

The lower side guide members 31 and 31, as shown in FIG. 3, are located on the under side of the belt guide plate 16 to prevent the inward shift of the belt, made of round bars with shortly tapered ends and formed in an arc shape with a curvature radius to contact with the inner side slant face of the thick portion 21. The guide member, here, is divided in two 31 and 31, because the driving roller 41 and the pinch roller 42a are present there, as shown in FIG. 3.

The material of the upper and lower guide members 30, 31 and 31 is determined depending on to the material of the bead composing element 2b. If one of them is synthetic resin, the other must be metal. If one of them is sintered metal, the other may be metal.

The press member 32 is, as illustrated in FIG. 5 (FIG. 5 shows only the upper side guide member 30, however, the lower side guide members 31 and 31 also have the same structure), provided with a groove 32a with an arc section. The upper side of the upper guide member 30 and the lower sides of the lower guide members 31 and 31 are respectively received within the grooves 32a so that the upper and lower guide members 30, 31 and 31 are positioned to stay therein in contact with the inner slant face of the thick portions 21.

The screw 33 is formed with a male screw fixed with a manually rotatable portion of a large diameter on one end. The upper and the lower side guide members 30, 31 and 31 and the curve conveyor belt 2 may be easily removed by grabbing and rotating the manually rotatable portion of the screw 33, without using a tool.

The driving member 4, as shown in FIGS. 1 to 3, includes a motor 40 with a decelerator, the driving roller 41, the pinch roller unit 42 and a controller (not shown). The motor 40 is bolted together to the mounting plate 10 of the motor supporting member 1a. The driving roller 41 is attached on the output shaft of the motor 40 with the decelerator. The pinch roller unit 42 is attached on the unit mounting plate 13. The controller is to change the rotation of the output shaft of the motor 40 with the decelerator by changing the frequency.

The pinch roller unit 42, as shown in FIGS. 2 and 4, holds the curve conveyor belt 2 between the pinch roller 42a and the driving roller 41 to reliably rotate and drive the curve conveyor belt 2 by the friction engagement. This pinch roller unit 42 is constituted so as to adjust the force for holding the curve conveyor belt 2 between the pinch roller 42a and the driving roller 41. Separation of the pinch roller 42a from the driving roller 41 allows to release the holding engagement of the curve conveyor belt 2.

The motor 40 with the decelerator, the driving roller 41 and the controller are already known, and will not be described here in detail.

The cover 5 includes, as shown in FIGS. 1 and 2, an inner peripheral side cover 5a and an outer peripheral side cover 5b.

The inner peripheral side cover 5a, as shown in FIG. 1, is formed in a fan shape so as to cover the inner peripheral edge area of the curve conveyor belt 2 and the vicinity thereof. The cover 5a is screwed together with an upper portion 61a of the leg member 61 through a manually rotatble cover attaching screw 50 as shown in FIG. 2.

The outer peripheral side cover 5b, as shown in FIG. 1, is shaped so as to cover the outer periphery edge area of the curve conveyor belt 2 and the vicinity thereof, i.e., formed in a shape to cover the bead composing elements 2b, the upper guide member 30, the press member 32, the screw 33, the motor 40 with the decelerator, the controller and the like. The cover 5b is attached to a vertical plate part 14b of the belt mounting plate 14 through a manually rotatable cover attaching screw 50.

The leg member 6, as shown in FIGS. 2 and 3, includes a leg portion 60 in an up-side-down T-shape formed by fixing a pillar 60a to the center of a horizontal beams 60b, a leg portion 61 of one pillar, a horizontal beam 62 connecting the leg portion 61 and the pillar 60a, and foot portions 63, 63 and 63 with height adjustable screws attached on the both ends of the horizontal beam 60b and the bottom portion of the leg portion 61. The outer side portion of the belt having the motor 40 with the decelerator and the like is supported by the leg portion 60, while the inner side portion of the belt on the belt mounting plate 14 is supported by the leg portion 61.

Here, when the cover attaching screw 50 is removed, the upper portion 61a of the leg portion 61 can be rotated with a hinge T.

As shown in FIG. 4, the curve conveyor belt 2 is stretched between the end rollers 15 and 15 so as to maintain a certain rotation track by the belt mounting plate 14, the two belt guide plates 16 and 16, the driving roller 41 and the pinch roller 42a.

Furthermore, as described above, the conveyor belt 2 is stretched between the end rollers 15 and 15, and, in this state shown in FIGS. 1, 3 and 5, the inner slant faces of the thick portions of a number of bead composing elements 2b are in contact with the upper and lower guide members 30, 31 and 31.

Therefore, when the motor 40 with the decelerator is driven, the curve conveyor belt 2 rotates being caught and held between the driving roller 41 and the pinch roller 42a. And the bead composing elements 2b forward sliding on the upper and lower side guide members 30, 31 and 31 in the above mentioned contact state therewith. Consequently, the conveyor belt 2 is prevented from inward shifting. Namely, the bead consisting of a number of bead composing elements 2b exhibit the same function as a continuously formed bead.

The curve conveyor belt 2 may be removed from the conveyor main body 1 with the following steps (1) to (5).

(1) Release the manually rotatable screw 50 for mounting the cover, and remove the inner side cover 5a and the outer side cover 5b (2) Rotate the upper portion 61a of the leg member 61 with the hinge from a position shown by continuous line to another position shown by two-dot chain line in FIG. 2

(3) Loose the manually rotatable screw 33 to remove the upper and lower guide members 30, 31 and 31 received within the groove 32a from the press member 32

(4) Separate the pinch roller 42 away from the driving roller 41 to release the conveyor belt 2 being held therebetween (5) After the above steps (1) to (4), shift the curve conveyor belt 2 from the outer peripheral side toward the inner peripheral side so that the curve conveyor belt 2 may be removed from the conveyor main body 1

(6) When attaching the curve conveyor belt 2 on the conveyor main body 1, take the above steps reversely As stated above, in the constitution of this curve conveyor belt 2; (1) the bead are composed with a number of bead composing elements disposed on across the entire outer peripheral area of the belt main body 2a, (2) the width in the belt forwarding direction of each bead composing element 2b is as narrow as about 20 to 60% of the diameter of the straight end roller 15 having a small diameter, and (3) the adjacent bead composing elements 2b and 2b are separated from each other, or are connected with a thin piece 20c. Since the bead is formed with a number of bead composing element 2b, in this curve conveyor belt 2, extremely less crack or breakage may occur in the beam composing elements 2b, and thereby the belt 2 withstand the use for a long term.

In case bead composing elements 2b are pinned or sewed together with the belt body 2a, when one or some of the bead composing elements 2b are damaged, the damaged one or some may be easily replaced. That is, employing bead composing elements 2b on the belt body 2a, even if one or some of the bead composing elements 2b are damaged, the conveyor belt may be continuously used only by replacing the damaged bead composing elements 2b.

Advantageous features of the belt body 2a are described below.

In the bolt body 2a, the joint portion, or the end portion of the fan-shaped belt forming sheet S, is formed by one time press cut with a Thompson blade, and this lessens a number of manufacturing steps and manufacturing cost.

Furthermore, the belt body 2a has a finger joint from the inner peripheral end to near the outer peripheral end. And in the other area from the portion to be held between the driving roller 41 and the pinch roller 42a and the vicinity thereof up to the outer peripheral end, the straight cut lines L each of which has a large angle α2 with respect to the tangent L on the peripheral direction line of the belt are joined together to be a single joining line. Therefore, twisting load due to the change in the peripheral speed by the driving roller 41, the belt body 2a and the pinch roller 42a and inwardly shifting force of the belt body 2a may be prevented by the shift prevention member 3. And, as a result, even if pull force in a width direction of the belt body 2a, peeling and breakage hardly occurs at a portion indicated with the numeral 27 of the belt body 2a.

The end portions of the fan-shaped belt forming sheet S are practically joined together with a finger joint, and the joined portion will not become thicker like those with the skiving joint or the step joint.

Furthermore, the curve conveyor belt 2 may be easily wound around on the end rollers 15 having a small diameter, so that the belt can be also rotated in a reverse direction.

The above holds true in case the cut line L2 is curved. It also holds true if the joint of the part from the portion to be held between the driving roller 41 and the pinch roller 42a and the vicinity thereof up to the outer peripheral end is made with fingers of a larger pitch of about 30 to 100 mm, and that of the other part is made with fingers of a smaller pitch of about 5 to 30 mm.

The effects of using the end roller 15 are as follows. The end roller 15, as shown in FIG. 1, is formed with the axial piece 15a and a plurality of resin rollers 15b rotatably provided thereon. And the bearing 15c (which has the same diameter as or a larger diameter than the outer diameter of the resin roller 15b) is provided between the adjacent resin rollers 15b and 15b located on the outer peripheral side of the belt. Therefore, in the outer peripheral area of the belt where the peripheral speed of the belt body 2a is rather large, the belt body 2a forwards along with the rotation of the outer lace of the bearings 15c, while in the inner peripheral area of the belt where the peripheral speed of the belt body 2a is small, the belt body 2a forwards along with the rotation of the resin rollers 15b. Therefore, in the outer peripheral area with a larger peripheral speed, harsh squeaking and frictional noises may be extremely suppressed (or eliminated) as compared with the case using end rollers having no bearings 15c.

The foregoing thick portion 21 of the bead composing element 2b is shaped in a trapezoid in a side view. The shape is not limitative thereto, but may be rectangular, square, triangle or the like.

Having the construction stated above, the present invention may provide a curve conveyor belt which (1) is free from peeling and/or breakage at the joint portion for a long term, (2) has no thick joint portion, and (3) is manufactured at low cost.

What is claimed is:

1. A curve conveyor belt formed by joining ends of a fan-shaped belt forming sheet and rotatingly driven in a fashion that a portion of the belt is caught and held between a driving roller and a pinch roller of a conveyor, comprising:

a first joining part from the portion caught and held between the driving roller and the pinch roller and a vicinity thereof to an outer peripheral end of the belt being a first finger joint: and a second joining part for a rest of the belt being a second finger joint; and wherein an angle between a cut line of the first finger joint and a tangent to a belt peripheral direction line of the first joining part is larger than an angle between a cut line of the second finger joint and a tangent to a belt peripheral direction line of the second joining part.

2. The curve conveyor belt according to claim 1 wherein the first joining part has a single cut line being one of a straight line and a gently curved line.

3. The curve conveyor belt according to claim 2, wherein the large angle between the single cut line and the tangent to the belt peripheral direction line of the first joining part is in a range between 45 to 90°.

4. The curve conveyor belt according to claim 1 wherein a pitch of the first finger joint of the first joining part is wider than a pitch of the second finger joint of the second joining part.

* * * * *